Dec. 13, 1927.
F. P. FORSS
1,652,401
ELECTRIC DRILL
Filed Jan. 5, 1925    2 Sheets-Sheet 2
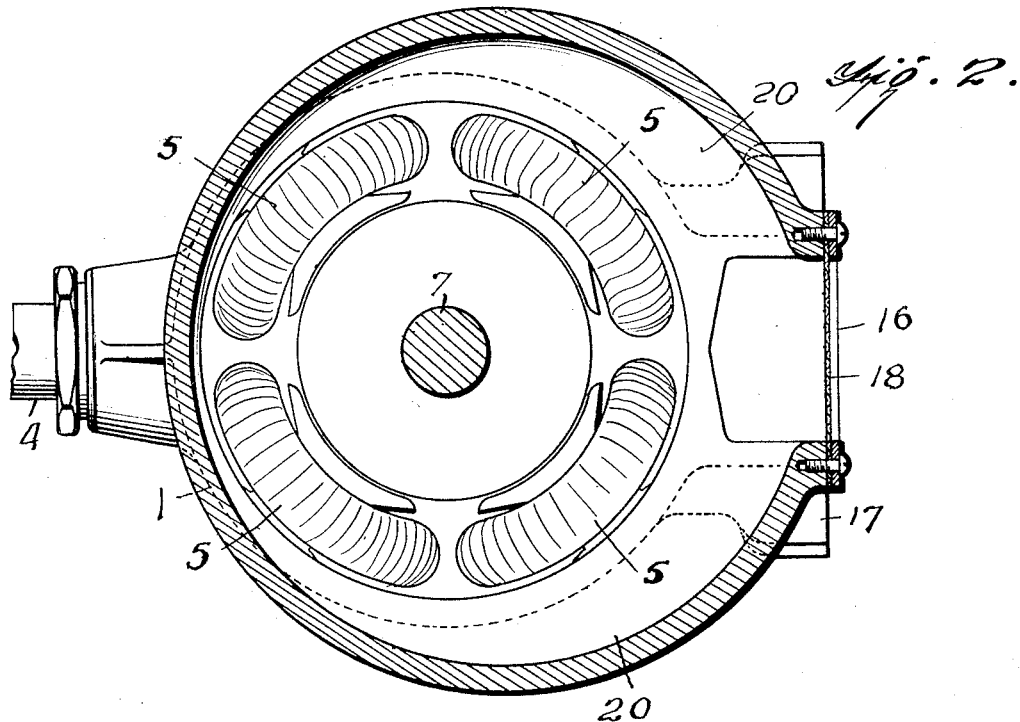
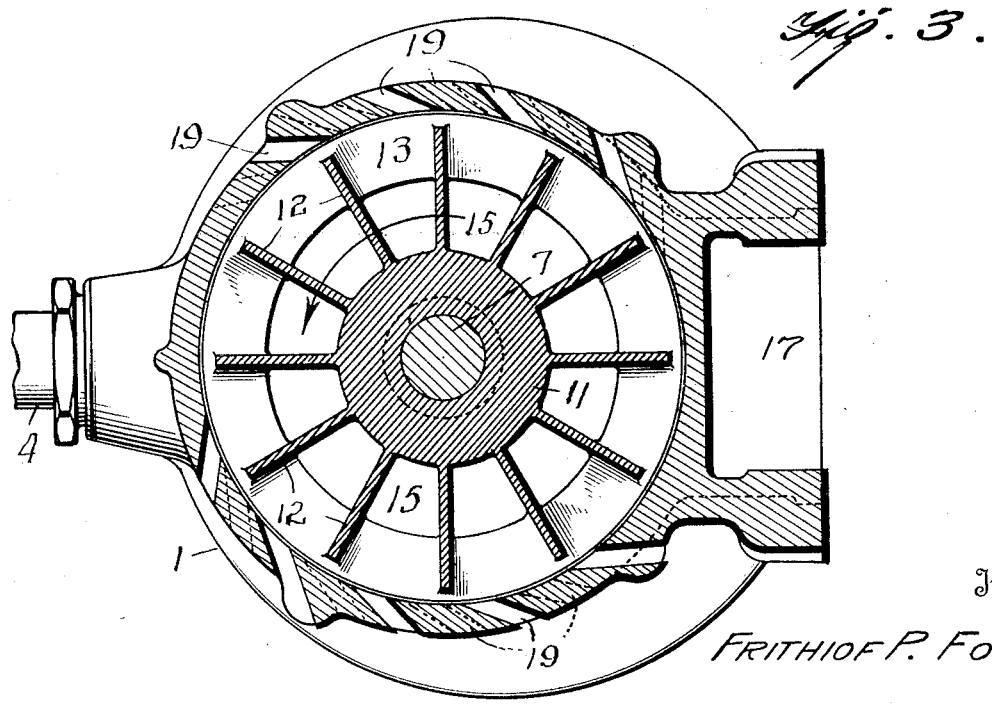
Inventor
FRITHIOF P. FORSS,
By Eugene Ewan
Attorney Patented Dec. 13, 1927.

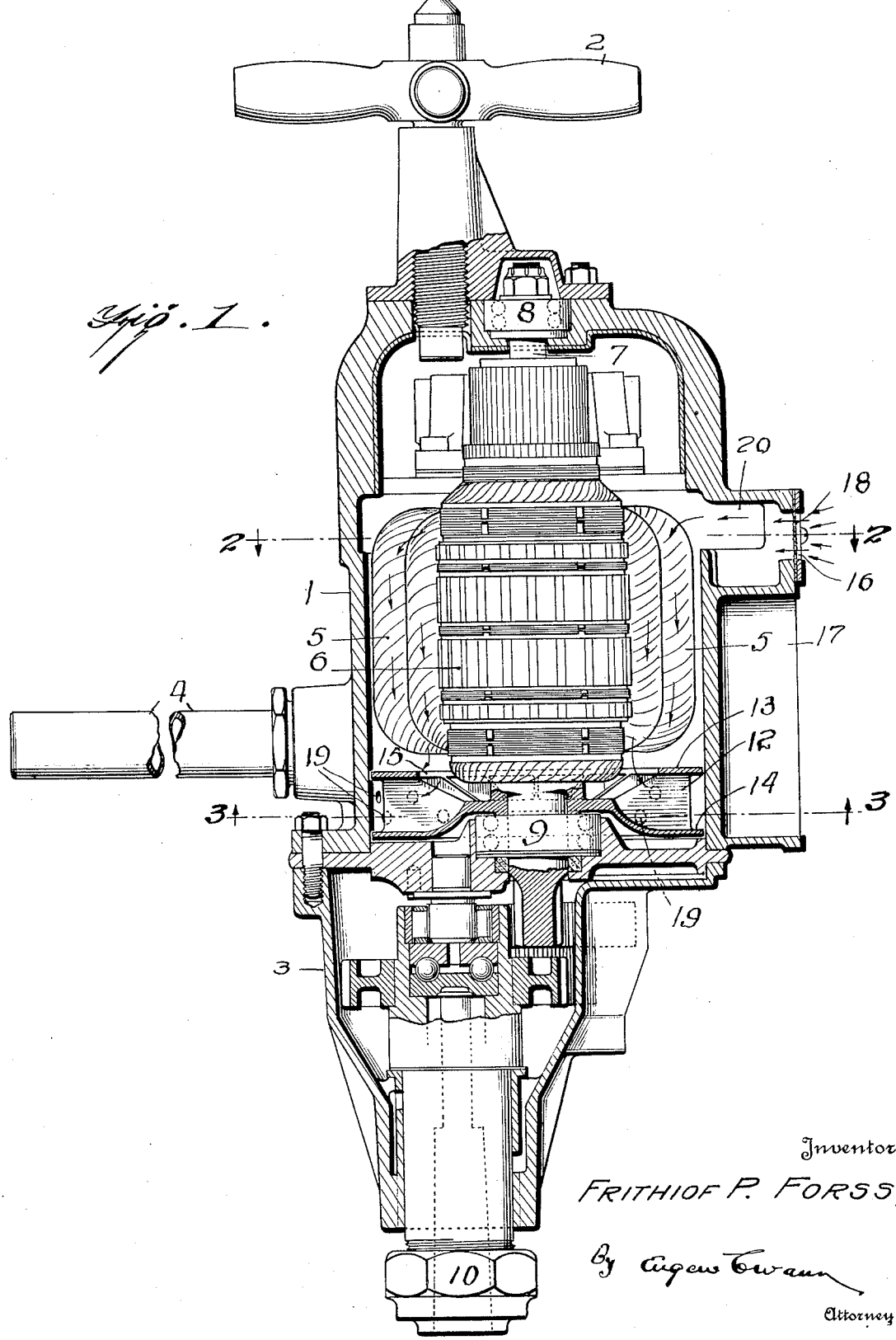

1,652,401

UNITED STATES PATENT OFFICE.

FRITHIOF P. FORSS, OF AURORA, ILLINOIS, ASSIGNOR TO INDEPENDENT PNEUMATIC TOOL COMPANY, OF CHICAGO, ILLINOIS, A CORPORATION OF DELAWARE.

ELECTRIC DRILL.

Application filed January 5, 1925. Serial No. 490.

This invention relates to air cooled electric motors and more particularly to motors for portable electric drills.

Heretofore, it has been the practice to air cool electric motors by means of an air fan arranged within a casing containing the motor, the casing being formed with a series of air inlet openings and a series of air outlet or exhaust openings, all of said openings being radially disposed with respect to the axis of the motor. Thus the exhaust air must, in trying to escape, make a right-angle turn, which together with the low pressure within the casing greatly retards its escape, and consequently the temperature of the motor is not sufficiently reduced to permit of a maximum load on the motor by reason of retarded air circulation. Furthermore, in portable electric drills which are air cooled in the manner above described, the air inlet openings extend in a series around the casing, and afford ready means of ingress for dirt into the casing whenever the drill is laid down or dragged along on dirty surfaces, and causing the drill to be ruined in a short period of time.

One object of my invention is to provide means whereby a free and uninterrupted circulation of air is had over the motor for maintaining a low temperature at maximum load.

Another object of my invention is to so arrange the air inlet means that dirt, shavings, chips, and the like will not be drawn into the drill by the incoming air when laid down on the floor or ground or dragged over the same.

Other and further objects of my invention will appear from the following specification taken in connection with the accompanying drawings, in which—

Fig. 1 is a longitudinal sectional view of a portable electric drill embodying my invention; and Figs. 2 and 3 are transverse sectional views taken on lines 2—2 and 3—3, respectively, of Fig. 1.

The portable electric drill, shown in the drawings, has a field case 1 with a feed screw 2 at one end and a gear case and spindle bearing 3 at the other end and a side handle 4, as in tools of this kind.

In the case 1 is an electric motor having its field coils 5 fixed in said case in any suitable manner and its armature 6 on a shaft 7 having its ends journaled in antifriction bearings 8, 9, carried by the cases 1 and 3, respectively, as shown in Fig. 1. The end of the shaft 7 at the bearing 9 extends into the case 3 and is geared to the chuck carrying spindle 10, as shown.

A rotary fan is fixed to the shaft 7 between the armature 6 and bearing 9. As shown in Fig. 3, said fan has a hub 11 and a plurality of blades or vanes 12 extending radially outward therefrom. Said blades 12 are between side walls 13, 14, the latter being in the form of a solid disc extending to the hub 11. The other wall 13 is in the form of a ring the center of which provides air intake openings 15 into the spaces between the blades or vanes 12 about the hub 11. These spaces open through the outer periphery of the fan between the side walls 13, 14 and provide an outlet for the fan.

The casing 1 has a single air inlet opening 16 at the end of the motor opposite the fan, as shown in Fig. 1. This opening is at the switch lug 17 and is covered by a wire mesh screen 18 to exclude dirt, etc. About the fan the inside of the casing 1 is circular and the fan fits closely in the same, as shown in Fig. 3. In this portion, the case 1 has a plurality of outlet or vent holes 19 drilled through the case on a tangent to the outer periphery of the fan and distributed about the same. At the inlet opening 16 and about the motor, the inside of the casing 1 is enlarged eccentrically with respect to the motor to provide air channels 20, 20 (Fig. 2) about the field of the motor and which channels communicate directly with the inlet opening 15 of the fan, as shown in Fig. 1.

In operation, the fan draws air into the casing 1 through the single inlet opening 16 and causes the incoming air to flow over and cool the motor in its travel through the motor and along the channels 20, 20 to reach the fan. This air is forced out of the case by the fan through the vent holes 19, and, these being tangential to the fan, the air is ejected from the casing 1 in a straight line without obstruction, thus providing a free and efficient circulation of air through the drill to cool the motor.

With the air channels 20, 20, a single inlet opening 16 may be employed, and with this at the switch lug it is on that side of the drill above the floor or ground when the drill is laid down. Consequently, dirt, chips, shavings, etc., will not be drawn into the drill by the fan when the drill is laid down while running. Moreover, the position of this inlet opening prevents it from being clogged when the drill is dragged over a dirty floor or over the ground, as is frequently done with drills of this kind. Thus, with a single inlet opening the drill is kept free from injury by dirt, etc. being drawn into it, as happens when the air inlet openings are arranged around the casing and opening against and close to the floor or ground as heretofore. With but a single opening, the drill casing 1 is not weakened as when a plurality of openings are provided about the drill as heretofore.

The single opening 16 by its position allows it to be made large enough for the intake of sufficient air for efficient cooling without fear of chips, shavings, and the like being drawn into the opening. The structure disclosed cools the motor sufficiently for it to operate at a very much greater load and thus makes my invention well adapted to portable electric drills because these tools must be extremely powerful in proportion to their weight. With the outlet or vent openings 19 tangential, the air is not required to make right-angle turns to escape, as heretofore, thus allowing the air to escape immediately it is thrown from the fan and with no obstruction to build up any back pressure to retard free and uninterrupted circulation.

I claim as my invention:

1. In a portable electric drill, the combination with an electric motor, of a casing surrounding the same and having air inlet means adjacent one end of the motor and a multiplicity of air outlet openings adjacent the other end of the motor, and a rotary fan in the casing at the air outlet openings and operated by the motor for creating a circulation of air over the motor to cool the same in the operation of the fan, said outlet openings being distributed about the casing at the outer periphery of the fan and opening through the casing tangentially to the fan.

2. In a portable electric drill, the combination with an electric motor, of a casing surrounding the same and having a single air inlet opening adjacent one end of the motor and a multiplicity of air outlet openings adjacent the other end of the motor, and a rotary fan in the casing at said air outlet openings and operated by the motor for creating a circulation of air over the motor to cool the same in the operation of the fan, said outlet openings being distributed about the casing at the outer periphery of the fan and opening through the casing tangentially to said fan, said casing being enlarged at the inlet opening and about the field of the motor to provide air channels to the fan between the motor and the casing.

3. In a portable electric drill, the combination with an electric motor, of a casing surrounding the same and having a single air inlet opening adjacent one end of the motor and a multiplicity of air outlet openings adjacent the other end of the motor, and a rotary fan in the casing at said air outlet openings and operated by the motor, said casing at the inlet opening and about the field of the motor being enlarged eccentrically with respect to the motor to provide air channels to the fan between the casing and the motor, said fan fitting closely in the portion of the casing surrounded thereby and having a central intake opening for said air channels and peripheral outlets for said outlet openings, the latter being distributed about the casing at the outer periphery of the fan and opening through the casing tangentially to said fan.

4. In a portable electric drill, the combination with an electric motor, of a casing surrounding the same and having an outwardly extending switch lug on one side thereof, said casing having a single air inlet at said lug adjacent one end of the motor, said casing being formed in its inner face with an enlarged air channel at said inlet and about the motor, said casing having a plurality of air outlet openings at the other end of the motor, and a rotary fan in the casing at said air outlet openings and having a centrally disposed intake opening into said channels, said outlet openings being tangential to the outer periphery of said fan and the latter having peripheral outlets.

5. In a portable electric drill, the combination with an electric motor, of a casing surrounding the same and having an outwardly extending switch lug on one side thereof, said casing having air inlet means opening into the same adjacent one end of the motor at said lug, a multiplicity of air outlet openings in the casing adjacent the other end of the motor, and a rotary fan in the casing at the air outlet openings and operated by the motor for creating a circulation of air over the motor to cool the same in the operation of the fan, said outlet openings being distributed about the casing at the outer periphery of the fan and opening through the casing tangentially to the fan.

In testimony that I claim the foregoing as my invention, I affix my signature this 30th day of December, 1924.

FRITHIOF P. FORSS.